US011946327B2

(12) United States Patent
Zhang et al.

(10) Patent No.: US 11,946,327 B2
(45) Date of Patent: Apr. 2, 2024

(54) AUTOMATIC RHEOLOGICAL PARAMETER MEASURING SYSTEM AND USE METHOD FOR FLOWING DRILLING FLUID WITH HIGH TEMPERATURE AND HIGH-PRESSURE

(71) Applicant: YANGTZE UNIVERSITY, Wuhan (CN)

(72) Inventors: FeiFei Zhang, Wuhan (CN); Tao Peng, Wuhan (CN); YueZhi Wang, Wuhan (CN); YiDi Wang, Wuhan (CN); He Liu, Wuhan (CN); Zhong Cheng, Wuhan (CN); YiBing Yu, Wuhan (CN); Kai Wei, Wuhan (CN)

(73) Assignee: YANGTZE UNIVERSITY, Wuhan (CN)

( * ) Notice: Subject to any disclaimer, the term of this patent is extended or adjusted under 35 U.S.C. 154(b) by 100 days.

(21) Appl. No.: 17/357,136

(22) Filed: Jun. 24, 2021

(65) Prior Publication Data
US 2022/0098942 A1 Mar. 31, 2022

(30) Foreign Application Priority Data
Sep. 25, 2020 (CN) .......................... 202011024517.6

(51) Int. Cl.
*G01N 11/00* (2006.01)
*E21B 21/08* (2006.01)
*G01N 11/02* (2006.01)

(52) U.S. Cl.
CPC .............. *E21B 21/08* (2013.01); *G01N 11/00* (2013.01); *G01N 11/02* (2013.01); *E21B 2200/20* (2020.05); *G01N 2011/006* (2013.01)

(58) Field of Classification Search
CPC .. G01N 11/00; G01N 11/02; G01N 2011/006; G01N 11/04; G01N 11/08; G01N 2011/0093; G01N 2011/026
See application file for complete search history.

(56) References Cited

U.S. PATENT DOCUMENTS

| 2011/0185795 A1* | 8/2011 | Colquhoun ............ G01N 11/04 |
| | | 73/152.21 |
| 2013/0192360 A1* | 8/2013 | Jamison .................. E21B 21/00 |
| | | 73/152.19 |

(Continued)

FOREIGN PATENT DOCUMENTS

| CN | 101892824 A | * 11/2010 |
| CN | 102434120 A | * 5/2012 |
| CN | 111622745 A | * 9/2020 |

OTHER PUBLICATIONS

CN-111622745-A—Translate (Year: 2020).*
CN-102434120-A—Translate (Year: 2012).*
CN-101892824-ATranslate (Year: 2010).*

*Primary Examiner* — Kristina M Deherrera
*Assistant Examiner* — Fatemeh Esfandiari Nia
(74) *Attorney, Agent, or Firm* — WPAT, P.C (57) ABSTRACT

The disclosure relates to an automatic measuring system and a method thereof for drilling fluid parameters measurement. The system includes i. mud container, configured for test drilling fluid preparation and samples collection; ii. heat jacket, configured to keep the drilling fluid in the tank warm iii. heat exchanger, configured to simulate the practical conditions; iv. plunger pump, configured to pump the test drilling fluid to the flowing test device; v. flow test device, configured to simulate the flowing states of drilling fluid in the borehole annulus and drilling string, and also measure the pressure and flow rate of drilling fluid vi. control module, configured to obtain rheological parameters and the best (Continued)

rheological mode of the drilling fluid in the borehole annulus and drilling string based on the pressure and flow rate.

6 Claims, 1 Drawing Sheet

(56) References Cited

U.S. PATENT DOCUMENTS

2018/0058992 A1\* 3/2018 van Oort ................ G01N 11/02
2019/0360286 A1\* 11/2019 Ye .......................... G01N 11/00
2020/0217780 A1\* 7/2020 Su .......................... G01N 33/30

\* cited by examiner

AUTOMATIC RHEOLOGICAL PARAMETER MEASURING SYSTEM AND USE METHOD FOR FLOWING DRILLING FLUID WITH HIGH TEMPERATURE AND HIGH-PRESSURE

FIELD OF THE DISCLOSURE

The invention relates to the technical field of oil and gas drilling, especially relates to an automatic rheological parameter measuring system and use method for flowing drilling fluid with high temperature and high-pressure.

BACKGROUND

At present, the sampling measurement and automatic measurement are the two common methods for drilling fluid rheological parameters measurement in the oil field. For sampling measurement, it's difficult to ensure the ambient temperature and pressure during the measurement process be consistent with the borehole conditions. Also, additives are often used for improving the performance of mud and cement, so the drilling fluid performance is dynamic changing and the sampling measurement method can't capture this in real time. For the common automatic measurement method, the devices are mostly based on the principle of the rotational viscometer. Therefore, this method requires a large amount of input data and its application range is limited. In addition, the device for automatic measurement shows complex structure and poor reliability, and requires a long experiment interval which results in a lower applicability for field application.

For the automatic method of drilling fluid rheological parameter measurement, fluid density and instantaneous pressure are derived from the sensor measured flow rate and pressure.

Furthermore, the measurement principle is too simple and it is quite different from the actual downhole flow state of the drilling fluid. It does not consider the thixotropy which caused by the shear stress of the mud. For these reasons, the traditional automatic methods can not accurately measure the rheological parameters under different pressures and flow rates.

SUMMARY

A technical problem to be solved by the disclosure is to provide an automatic measuring system for high temperature and high pressure drilling fluid parameter measurement in the prior art.

an automatic measuring system for high temperature and high pressure drilling fluid parameter measurement, including a slurry tank, a mud heat exchanger, a plunger pump, a flow test device and a control module, wherein: the mud container, heat exchanger, and plunger pump are connected in turn with pipeline. The heat exchanger is located below the mud tank and the main function is to receive the test drilling fluid from the tank and heat it to simulate the practical conditions. The mud container, which is used both for test drilling fluid preparation and the tested samples collection with liquid inlet and outlet respectively. The heat jacket, which is arranged on the outer surface of the fluid tank and mainly used to keep the drilling fluid in the container warm by heating. The plunger pump is used to pump the test drilling fluid to the flowing test device. The flow test device is used to simulate the flowing states of drilling fluid in the borehole annulus and drilling string, also measure the pressure and flow rate of drilling fluid in the inlet and outlet of the test device. The control module, which can automatically measure rheological parameters and obtain the best rheological mode of the drilling fluid in the borehole annulus and drilling string based on the inversion of instantaneous pressure and flow rate.

Further, the flow test device comprises a temperature sensor, a pressure and flow rate sensor, a conventional test pipeline section and an annulus test pipeline section. The temperature sensor is used to detect the temperature of the drilling fluid in the entrance. The pressure and flow rate sensors are used to obtain the pressure and flow rate of the drilling fluid at the inlet and outlet of the test device in real time. The conventional test pipeline section and the annulus test pipeline section are respectively used to simulate the flow state of the drilling fluid under practical conditions.

Further, the control module can automatically measure rheological parameters and obtain the best rheological mode of the drilling fluid in the borehole annulus and drilling string based on the inversion of instantaneous pressure and flow rate. In detail, the control module can obtain the rheological parameters of different flow models such as power-law, Bingham, Herschel-Bulkley and Carson model based on the instantaneous pressure and flow rate. According to the obtained rheological parameters and the pressure dissipation calculation model for different rheological models, the flow rate and pressure dissipation can be calculated. Then the calculated values can be compared to the measured values for contrastive analysis, after that a more realistic rheological model and the associated rheological parameters can be acquired for drilling fluid flow in conventional pipeline or annulus pipeline.

Further, the flow type automatic drilling fluid parameter measurement system also contain a check valve, two back-pressure control valves and a flow meter. The check valve is arranged at the inlet pipe of the flow test device to prevent backflow of the testing drilling fluid. One of the back pressure control valves is arranged in the outlet pipeline of the moveable test device, and the other is arranged in the pipeline between the mud container and the plunger pump. Both the back pressure control values are used for throttling. The flow meter is arranged between the check valve and the moveable test device to monitor the flow rate of test fluid through the test device.

The invention also provides a flow type automatic measuring system for high temperature and high pressure drilling fluid parameter measurement may which includes the following steps:

Simulate the flow state of drilling fluid in annulus or conventional pipeline under actual working conditions;

Real-time monitor the pressure and flow rate of drilling fluid when flow in and out of the flow test device;

Based on the instantaneous pressure and flow rate, obtain the most realistic rheological model and the associated rheological parameters by inversion technique.

Further, a more realistic rheological model and the associated rheological parameters can be acquired for drilling fluid flow in conventional pipeline or annulus pipeline by inversion technique. The details can be described as: First, obtain the rheological parameters of different flow models such as power-law, Bingham, Herschel-Bulkley and Carson model based on the instantaneous pressure and flow rate; Second, calculate the flow rate and pressure dissipation with the obtained rheological parameters and the pressure dissipation calculation model for different rheological models; Thirdly, compare and analyze the calculated values and the measured values to obtain a more realistic rheological model and associated rheological parameters for drilling fluid flow in conventional pipeline or annulus pipeline.

For conventional pipeline, the rheological parameters can be calculated with the instantaneous pressure and flow rate. Specifically, the calculation for different flow models such as power-law, Bingham, Herschel-Bulkley and Carson use different computational formulas. For power law fluid, $$\frac{8V}{D} = \frac{4n}{(\tau_b)^3 K^{\frac{1}{n}}} \frac{\tau_b^{\frac{3n+1}{n}}}{3n+1}$$

where K is the consistency coefficient, n is the fluidity index, V is the average flow velocity, $\tau_b$ is the shear stress on the cylindrical surface, and D represents the diameter of the conventional pipeline;

For Bingham fluid, the formula for rheological parameters calculation is:

$$\frac{8V}{D} = \frac{\tau_b}{\mu_p}\left[1 - \frac{4\tau_0}{3\tau_b} + \frac{1}{3}\left(\frac{\tau_0}{\tau_b}\right)^4\right]$$

Where $\tau_0$ is the fluid dynamic shear force and $\mu_p$ is the plastic viscosity;

For Herschel-Bulkley fluid, the formula for rheological parameters calculation is:

$$\frac{8V}{D} = \frac{4n}{(1+6n+11n^2+6n^3)(\tau_b)^3 K^{\frac{1}{n}}}$$
$$\left\{[\tau_b - \tau_0]^{\frac{n+1}{n}}[2n^2\tau_0^2 + 2n(n+1)\tau_0\tau_b + (2n+1)(n+1)\tau_b^2]\right\}$$

For Carson fluid, the formula for rheological parameters calculation is:

$$\frac{8V}{D} = \frac{4}{(\tau_b)^3 \mu_\infty}\left[\frac{\tau_b}{6} - \frac{2}{5}(\tau_c \tau_b)^{0.5} + \frac{\tau_c}{4}\right]$$

Where $\tau_c$ is the dynamic shear force for Carson fluid and $\mu_\infty$ is the ultimate shear viscosity.

For the annulus pipe, the rheological parameters can be calculated with the instantaneous pressure and flow rate. Specifically, the calculation for different flow models such as power-law, Bingham, Herschel-Bulkley and Carson use different computational formulas. For power law fluid, $$Q = \frac{\pi n(R_o + R_i)R_\delta^2}{2(2n+1)}\left(\frac{\tau_b}{K}\right)^{\frac{1}{n}}$$

where Q is the flow rate, $R_o$ is the outer diameter of the annulus, $R_i$ is the inner diameter of the annulus, K is the consistency coefficient, n is the fluidity index, and $\tau_b$ is the shear stress on the cylindrical surface;

For Bingham fluid, $$Q = \frac{\pi(R_o + R_i)R_\delta^2}{6\mu_p} = \left[\tau_b - \frac{3}{2}\tau_0 + \frac{\tau_0^3}{2\tau_b^3}\right]$$

where $\tau_0$ is the fluid dynamic shear force and $\mu_p$ is the plastic viscosity;

For Herschel-Bulkley fluid, $$Q = \frac{\pi n(R_o + R_i)R_\delta^2}{2(2n+1)\tau_b^2 K^{1/n}}(\tau_b - \tau_0)^{\frac{n+1}{n}}\left(\tau_b + \frac{n}{n+1}\tau_0\right)$$

For Carson fluid, $$Q = \frac{\pi(R_o + R_i)R_\delta^2}{\mu_\infty \tau_b^2}\left[\frac{1}{6}(\tau_b^3 - \tau_0^3) - \frac{2}{5}(\tau_c)^{0.5}(\tau_b^{2.5} - \tau_0^{2.5}) + \frac{1}{4}\tau_0(\tau_b^2 - \tau_0^2)\right]$$

where $\tau_c$ is the dynamic shear force for Carson fluid and $\mu_\infty$ is the ultimate shear viscosity.

Further, the flow rata and pressure dissipation in annulus pipelines can be calculated with the obtained rheological parameters for different flow models. More specifically, use the different calculation model for different flow models to calculate the pressure dissipation first. Then for fluid flow in annulus pipeline, the flow rate can be calculated by the relation between pressure dissipation and flow rate:

$$q = \sqrt{\Delta p R_\delta / f \rho} / \pi(R_o^2 - R_i^2)$$

where q is the flow rate, $R_o$ is the outer diameter of the annulus, $R_i$ is the inner diameter of the annulus, $\Delta p$ is the pressure dissipation, and f is the Fanning friction factor.

Compared with the prior art, the advanced features of this invention include: can simulate the actual flow state of drilling fluid in the annulus and drill pipes; acquire the pressure and flow rate of the drilling fluid in the inlet and outlet of the test device in real time; the rheological mode and rheological parameters for conventional pipes and annulus pipes are calculated by the instantaneous pressure and flow rate; test conditions are more closer to the actual drilling situation, therefore the rheological parameter measurement is more accurate.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

Reference signs: 1-high temperature and high pressure control module; 2-test device for flowing fluid; 3-PLC control system; 11 mud container; 12-mud heat exchanger; 13-temperature sensor; 14-plunger pump; 15-check valve; 16-flow meter; 17-first back pressure valve; 18-second back pressure valve; 21-pressure and flow rate sensors; 22-conventional test pipe; 23-annular test pipe.

DETAILED DESCRIPTION OF PREFERRED EMBODIMENTS

The examples of invention provide an automatic measuring system for high temperature and high pressure drilling fluid parameter measurement, which contains a mud container 11, a heat exchanger 12, a plunger pump 14, a moveable test device 2 and a control module 3:

The mud container, heat exchanger, and plunger pump are connected in turn with pipeline. The heat exchanger is located below the mud tank and the main function is to receive the test drilling fluid from the tank and heat it to simulate the practical conditions. The mud container, which is used both for test drilling fluid preparation and the tested samples collection with liquid inlet and outlet respectively. The heat jacket, which is arranged on the outer surface of the fluid tank and mainly used to keep the drilling fluid in the container warm by heating. The plunger pump is used to pump the test drilling fluid to the flowing test device. The moveable test device is used to simulate the flowing states of drilling fluid in the borehole annulus and drilling string, also measure the pressure and flow rate of drilling fluid in the inlet and outlet of the test device. The control module, which can automatically measure rheological parameters and obtain the best rheological mode of the drilling fluid in the borehole annulus and drilling string based on the inversion of instantaneous pressure and flow rate.

Figure 1:
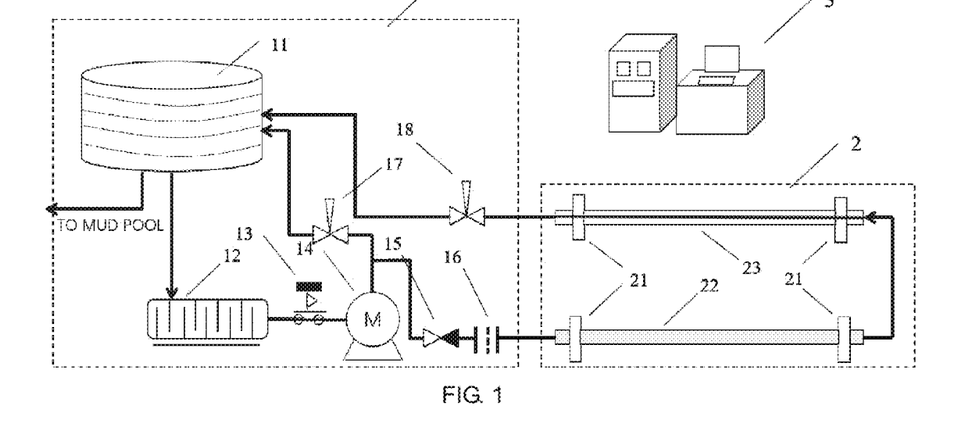
FIG. 1 is a schematic diagram of the measurement system provided by this invention for high-temperature and high-pressure drilling fluid parameter automatic measurement.

In a specific embodiment, a schematic structural diagram of an automatic drilling fluid parameter measurement system is shown in FIG. 1. The measurement system includes successively connected mud container 11 (including heating insulation jackets), Mud heat exchanger 12, temperature sensor 13, plunger pump 14, check valve 15, flow meter 16, first back pressure valve 17, second back pressure valve 18;

The mud container 11 has an inlet at the upper end to receive the fluid discharged from the entire circulation pipeline, also can send the mud to the heat exchanger 12 or the removal tank, and the mud container 11 is equipped with a heating jacket to play the drilling fluid has a thermal insulation effect, the maximum temperature can reach 70° C. It can also meet the needs of adding additives under actual working conditions. The mud container 11 is mainly used to configure the drilling fluid for testing. The four top corners of the mud container 11 are equipped with high-speed faucet. The water nozzle draws the liquid from the tank through the pipeline and re-injects it into the tank through the pump pressure, which can effectively prevent the bottom of the tank from being deposited and fully hydrate the solids. At the same time, due to the large volume of the slurry tank, the entire circulation pipeline is in stable working conditions, it can also act as a buffer tank;

The mud heat exchanger 12 is provided with a full exchange tube at the downstream position of the mud distribution tank. The state of the drilling fluid flowing through conforms to the strong convection heat exchange properties in the turbulent boundary layer, and can fulfill the requirements of sufficient heat exchange and temperature control. The layout is easier to maintain than the rotary type, energy-saving and efficient; the tank is equipped with a heater; the temperature sensor 13 is used to detect the temperature of the circulating loop liquid; the plunger pump 14 is connected to the mud heat exchanger and will deliver the configured drilling fluid to the entire circulating flow testing device 2 (flow testing area) or complete the internal fluid circulation of the high temperature and high pressure device;

When put the invention into practice, it needs a high temperature and high-pressure environment condition. In the implementation example, the high temperature environment deployment is completed by setting a slurry tank and mud heat exchanger with a heating sleeve; among them, the electric heater is wrapped on the outside of the mud mixing tank, and preheat the experimental mud and further heat after passing through the heat exchanger. First, the mud circulation is completed inside the high temperature and high pressure device, and then the check valve to the test unit is opened. The pipeline between the mud pumped to the test unit is insulated by wrapping insulation cotton; The temperature status is fed back to the host computer through the sensor, and the host computer immediately sends out instructions to complete the automatic temperature adjustment. The temperature control range of the main temperature control device is room temperature +15~150° C., and the temperature control accuracy: ≤±1° C.; The liquid injection system of the device is completed. The output flow of the overall process is composed of a closed-loop control system consisting of a plunger pump, ABB inverter, electromagnetic flowmeter, and control software. The flowmeter feeds back the flow parameters detected in the pipeline to the control software, and control software calculates through PID, outputs the frequency control signal to the inverter, and controls the output flow by adjusting the speed of the injection pump through the inverter. When the pressure value exceeds the rated value, the back pressure control valve opens to fully ensure the normal operation of the system and the personal safety of the operator; the maximum displacement of the plunger pump is 45 m$^3$/h, and the head can reach 100 m; the devices along the line adopt high temperature and high pressure resistance material, the material of the flow test section is 316L steel, and the outer pipe of the annulus section with insulation material is high-strength glass, which has good thermal insulation;

In another specific embodiment, the entire process technology mainly includes drilling fluid configuration, fluid injection system setting, flow test area, constant temperature control system, real-time measurement device, acquisition control system and core computing module.

The overall design mainly includes the flow test area and the PLC control system 3. The drilling fluid configuration is mainly completed by the two systems of the slurry tank and the mud heat exchanger, and the overall high temperature environment setting can be realized at the same time;

The liquid injection system is mainly composed of slurry tank, mud heat exchanger, plunger pump, ABB frequency converter, electromagnetic flowmeter, safety valve, etc. The output range of ABB frequency converter: 0~400 Hz, accuracy: number: 0.01%, Simulation: 0.1%; electronic flowmeter range: 0~45 m$^3$/h, accuracy: ±0.5%, output signal: 4~20 mA, connection method: flange connection.

The flow test area mainly includes the conventional pipe section test area and the annulus pipe section test area. Conventional pipe section specifications: Ø75×15500 mm (replaceable Ø125×15500 mm), made of high-strength glass; annulus pipe section specifications: inner diameter Ø25×15500 mm, Outer diameter Ø75×15500 mm (replaceable Ø125×15500 mm), material: inner tube: 316L, outer tube: high-strength glass.

The constant temperature control system mainly includes an electric heating device wrapped outside the mud mixing tank, a mud heat exchanger, and the method of wrapping insulation cotton is used along the line for insulation; the real-time measurement device mainly includes the flow/pressure sensor set in each test section. Designed and produced with precision compensation technology, it has the characteristics of high precision and good stability. The test accuracy is ±1.0%. It is equipped with Hong Kong Hong run NHR digital display instrument as the secondary display instrument;

The acquisition control system and calculation module can mainly realize the pressure, temperature, flow, and other values in the equipment system, and control the injection flow of the injection pump; The data acquisition and external equipment control adopts Siemens PLC data acquisition control system, which has advantages of high acquisition accuracy, strong anti-interference ability and high reliability. At the same time, in order to ensure the accuracy of the collection and the stability of the electrical system, the following measures have been taken: (1) A power filter is installed at the power supply line to prevent electromagnetic interference generated by the electrical equipment itself from entering the power line, while preventing interference on the power line enter the equipment; (2) All analog input and output signals enter the electrical system through the isolation safety barrier; enhance the anti-interference ability of the detection and control loop and improve the reliability of the system; (3) Take effective measures to suppress electromagnetic radiation. Ensure that the electromagnetic field intensity at a distance of 30 cm from the control cabinet is less than 0.2 uT, and the electromagnetic radiation intensity is less than 40 µW/cm2, which are all lower than the safety limit in the national standard; (4) Take effective measures to improve the electrical system's resistance to electrical transients and rapid pulse groups surge capability to ensure that the system can work normally under lightning strikes and current disturbances; (5) Take effective measures to improve the electrical system's ability to withstand voltage drops to ensure that the system can work normally when the grid voltage fluctuates;

Preferably, the flow test device comprises a temperature sensor, a pressure and flow rate sensor, a conventional test pipeline section and an annulus test pipeline section. The temperature sensor is used to detect the temperature of the drilling fluid in the entrance. The pressure and flow rate sensors are used to obtain the pressure and flow rate of the drilling fluid at the inlet and outlet of the test device in real time. The conventional test pipeline section and the annulus test pipeline section are respectively used to simulate the flow state of the drilling fluid under practical conditions;

In specific implementations, pressure/flow sensors 21 are provided at the inlet and outlet positions of the flow test area for real-time monitoring of pressure and flow changes when the drilling fluid through the test area; this area contains the conventional test pipe 22 and the annulus test pipe 23, which can respectively simulate the flow state of the fluid in the annulus or conventional pipe flow under actual working conditions;

Preferably, the control module can automatically measure rheological parameters and obtain the best rheological mode of the drilling fluid in the borehole annulus and drilling string based on the inversion of instantaneous pressure and flow rate. In detail, the control module can obtain the rheological parameters of different flow models such as power-law, Bingham, Herschel-Bulkley and Carson model based on the instantaneous pressure and flow rate.

In a specific embodiment, the control module is a PLC control system 3, which includes a process control module and an arithmetic module. Various data measurement devices such as temperature sensor 13, flow meter 15, pressure/flow sensors 21, etc. can all realize the conversion of measurement to electrical signal on PLC system 3; the pumping flow 14, the proportioning relationship of the mud container 11 and the temperature heating can all be controlled by the user relying on the PLC system 3;

Preferably, the flow type automatic drilling fluid parameter measurement system also contains a check valve, two back-pressure control valves, and a flow meter. The check valve is arranged at the inlet pipe of the flow test device to prevent backflow of the testing drilling fluid. One of the back-pressure control valves is arranged in outlet pipeline of the moveable test device, and the other is arranged in the pipeline between the mud container and the plunger pump. Both the back-pressure control values are used for throttling. The flow meter is arranged between the check valve and the moveable test device to monitor the flow rate of test fluid through the test device.

In a specific embodiment, the check valve 15 is in the inlet pipe of the flow test area to prevent fluid from flowing back, and the flow rate meter 16 is connected after the check valve to monitor the flow into the flow test area. The first back-pressure valve 17 and the second back-pressure valve 18 are located at the high temperature and high-pressure circulation pipeline and the outlet pipe section of the flow test area, which used for throttling to prevent pressure holding and accidents in the entire cycle working condition;

During the specific implementation, the well structure, drilling tool assembly design, drilling fluid configuration, mud pump performance parameters and temperature and pressure conditions that should be reached before the experiment; Then opening the mud container 11 delivery valve depends on the ratio given by the user. After the proportioning is completed, close the check valve 15 and second back pressure valve 18; The plunger pump 14 starts to inject the drilling fluid into the high temperature and high pressure device after the flow signal is given by the PLC control system 3, and then the high temperature and high pressure unit reaches the dynamic cycle, Open the check valve 15 and the second back pressure valve 18 and close the first back pressure valve 17, The flowmeter 16 along the line and the pressure/flow sensor 21 are converted into electrical signals and returned to the PLC control system 3, and the flow and pressure signals begin to change; After everywhere along the line and flow test area 2 is filled with fluid and reaches dynamic equilibrium, the entire test system now constitutes a complete mud circulation loop.

The usage of the moveable automatic measuring system for high temperature and high pressure drilling fluid parameter measurement may comprise the following steps:
Simulate the flow state of drilling fluid in annulus or conventional pipeline under actual working conditions;
Real-time monitor the pressure and flow rate of drilling fluid when flow in and out of the flow test device;
Based on the instantaneous pressure and flow rate, obtain the most realistic rheological model and the associated rheological parameters by inversion technique.

In a specific embodiment, the flow-type high-temperature and high-pressure automatic drilling fluid parameter measurement method includes the flowmeter 16 along the line, the pressure/flow rate sensor 21, and the return electric signal changes in real time; Click the automatic drilling fluid parameter measurement of the control system 3, then the computer checks the connected relevant parameters to calculate the rheological parameters of the drilling fluid flowing through at the current step. The specific relevant parameters include the test pipe section (pipe section diameter, pipe wall friction coefficient, annulus inner and outer diameter), drilling fluid temperature, viscosity, flow rate and pressure value of measurement points in real-time, increase or decrease the displacement of the plunger pump 14;

The PLC control system 3 outputs different temperature signals to the slurry tank 11 and the mud heat exchanger 12. The heating jacket of the slurry tank 11 starts heating or cooling (the mud heat exchanger starts to work or stands by), and delivers a different temperature with the previous time step when the drilling fluid reaches the flow test area 3. Then PLC control system 3 returns the flow rate and pressure signal value to change from the previous time step, and the control system 3 repeatedly calculates the rheological parameters at the current step and outputs it;

Finally, turn off the plunger pump 15 until the fluid along the line is completely stationary. After the measurement is completed, clean up the residual fluid along the line;

The evaluation of rheological parameters of drilling fluid includes the following steps. The PLC control system 3 processes and transforms the electrical signals such as the instantaneous flow rate and pressure changes; and calculates the drilling fluid parameters in different modes parallelly. Then fit with the actual pressure dissipation, and the most suitable mode is selected to realize real-time automatic inversion of the rheological parameters of the drilling fluid flowing through the conventional pipe 22 or annulus pipe 23 Finally user can obtain the measurement results of the rheological parameters of the drilling fluid at the current time step; clear the memory and prepare for the next time step calculation;

Preferably, performing inversion can obtain the rheological parameters for different flow models such as the power law model, Bingham model and Herschel-Bulkley model can be calculated with the instantaneous pressure and flow rate. Specially, the calculation method can be defined as following for drilling fluid flow in conventional pipeline.

Figure 2:
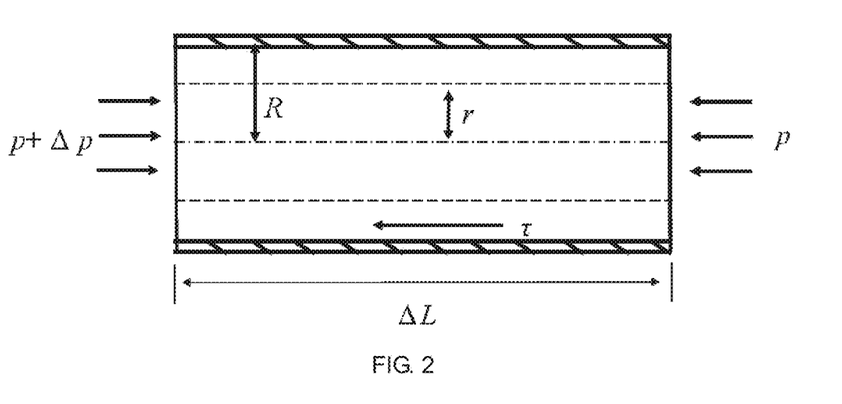
FIG. 2 is a schematic diagram for the force balance relationship of the circular pipes with test fluid flowing.

A schematic diagram of the force balance relationship of the flow of a circular pipeline (conventional pipeline), as shown in FIG. 2, the force balance relationship of the flow of a circular pipe is deduced as follows. On a cylinder with a radius of r and the center of the pipe axis, there is two forces in opposite directions, one is the force exerted by the pressure difference between the two ends of the tube on the cylindrical section; the other is the viscous resistance on the cylindrical wall during the flow process, and when the flow is stable, there is the following relationship:

$$2\pi\Delta L\tau = \Delta P\pi r^2$$

Among them, $\Delta P = P_{test2} - P_{test1}$ $\tau$ represents the shear stress on the cylindrical surface, arranged as:

$$\tau = \frac{\Delta P}{\Delta L}\frac{r}{2}$$

Is the largest at r=R, if it is represented by $\Sigma_b$, then there is:

$$\tau_b = \frac{\Delta PR}{2\Delta L} = \frac{\Delta PD}{4L}$$

The above formula is applicable to any time-independent fluid in steady state motion. It is obtained by Hagen equation:

$$Q = \frac{\pi R^4 \Delta P}{8\mu\Delta L} = \frac{\pi D^4 \Delta P}{128\mu\Delta L}$$

Among them, Q is the incoming electrical signal from the control system 3, that is the flow rate (m2/s), and there is $$Q = \frac{\pi D^2}{4}V,$$

therefore an expression for the pressure dissipation under the conventional pipe section:

$$\Delta P = \frac{32\mu V\Delta L}{D^2}$$

In the formula, V is the calculated average flow velocity, in m/s; $\mu$ is the obtained drilling fluid viscosity, in Pa·s, and is calculated by the pipe flow integral formula:

$$\frac{\pi D^2}{4}V = \int_0^R \pi r^2 \left(-\frac{du}{dr}\right)dr$$

Multiplying $$\frac{32}{\pi D^3}$$

left and right together then substituting the transformation, $$dr = \frac{D}{2\tau_b}d\tau,$$

has:

$$\frac{8V}{D} = \frac{4}{(\tau_b)^3}\int_{\tau_0}^{\tau_b}\tau^2 f(\tau)d\tau$$

The above equations V, D, $\tau_b$ are all known; $\tau_0$ is the fluid dynamic shear force (when the power law and the Casson model are taken, it is 0), Pa;

$$-\frac{du}{dr} = f(\tau)$$

is the velocity change gradient, which is related to rheological parameters. Therefore, there is based on the conventional pipe section the core idea of the algorithm for flowing real-time automatic inversion of dynamic drilling fluid rheological parameters. Flow meters and pressure/flow sensors along the line return electrical signals in real time; The control module processes the input electrical signals (OP and Q) and sends them to the calculation module; Use the different rheological equation substitute into the above integral to invert the rheological parameters in parallel; The pressure drop ($\Delta p$) and the flow rate (q) along the way are calculated in different rheological modes, and compared with real-time data ($\Delta P$ with Q), for fitting and outputting the best mode expression and each rheological parameter value at the current time step;

Preferably, for conventional pipes, while the test fluid is power law fluid, rheological parameters can be calculated as:

$$\frac{8V}{D} = \frac{4n}{(\tau_b)^3 K^{\frac{1}{n}}} \frac{\tau_b^{\frac{3n+1}{n}}}{3n+1}$$

where K is the consistency coefficient, n is the fluidity index, V is the average flow velocity, $\tau_b$ is the shear stress on the cylindrical surface, and D represents the diameter of the conventional pipeline.

For Bingham fluid, the formula for rheological parameters calculation is:

$$\frac{8V}{D} = \frac{\tau_b}{\mu_p}\left[1 - \frac{4\tau_0}{3\tau_b} + \frac{1}{3}\left(\frac{\tau_0}{\tau_b}\right)^4\right]$$

Where $\tau_0$ is the fluid dynamic shear force and $\mu_p$ is the plastic viscosity.

For Herschel-Bulkley fluid, the formula for rheological parameters calculation is:

$$\frac{8V}{D} = \frac{4n}{(1+6n+11n^2+6n^3)(\tau_b)^3 K^{\frac{1}{n}}}\left\{[\tau_b - \tau_0]^{\frac{n+1}{n}}\left[2n^2\tau_0^2 + 2n(n+1)\tau_0\tau_b + (2n+1)(n+1)\tau_b^2\right]\right\}$$

For Carson fluid, the formula for rheological parameters calculation is:

$$\frac{8V}{D} = \frac{4}{(\tau_b)^3 \mu_\infty}\left[\frac{\tau_b}{6} - \frac{2}{5}(\tau_c\tau_b)^{0.5} + \frac{\tau_c}{4}\right]$$

Where $\tau_c$ is the dynamic shear force for Carson fluid and $\mu_\infty$ is the ultimate shear viscosity.

Preferably, for conventional pipes, the flow rate and pressure dissipation in conventional pipelines can be calculated with the obtained rheological parameters for different flow models. More specifically, use the different calculation model for different flow models to calculate the pressure dissipation first. Then the flow rate can be calculated by the relation between pressure dissipation and flow rate:

$$q = \frac{\pi \Delta p R^4}{8L\mu}\left(1 - \frac{4}{3}\frac{r_b}{R}\right)$$

Obtain the flow, where q is the flow, $\Delta p$ represents the pressure loss, and $r_b$ is the radius of flow core.

In a specific embodiment, for the power-law mode, the rheological parameter is transformed into:

$$f(\tau) = \gamma = \left(\frac{\tau}{K}\right)^{\frac{1}{n}}$$

Substitution points have:

$$\frac{8V}{D} = \frac{4n}{(\tau_b)^3 K^{\frac{1}{n}}} \frac{\tau_b^{\frac{3n+1}{n}}}{3n+1}$$

In the above formula, only K (consistency coefficient, Pa·s$^n$) and n (fluidity index, dimensionless quantity) are unknown. When n=1, k=μ, it is the solution of Newtonian fluid; for different measuring points, it is easy to get V and $\tau_b$, then use reverse order thinking to obtain the power law mode rheological parameters;

For Bingham model, deformed by rheological parameters:

$$f(\tau) = \gamma = \frac{\tau - \tau_0}{\mu_p}$$

$$\tau \geq \tau_0, \gamma = \frac{\tau - \tau_0}{\mu_p}$$

$$\tau < \tau_0, \gamma = 0$$

Substitution points have:

$$\frac{8V}{D} = \frac{\tau_b}{\mu_p}\left[1 - \frac{4\tau_0}{3\tau_b} + \frac{1}{3}\left(\frac{\tau_0}{\tau_b}\right)^4\right]$$

In the above formula, only $\tau_0$ (fluid dynamic shear force, Pa) and $\mu_p$ (plastic viscosity, mPa·s) are unknown; for different measuring points, it is easy to obtain V and $\tau_b$, then use the reverse order thinking to obtain the Bingham mode rheological parameters;

For the Herschel-Bulkley model, deformed by rheological parameters:

$$f(\tau) = \gamma = \left(\frac{\tau - \tau_0}{K}\right)^{\frac{1}{n}}$$

Substitution integrals have:

$$\frac{8V}{D} = \frac{4n}{(1+6n+11n^2+6n^3)(\tau_b)^3 K^{\frac{1}{n}}}\left\{[\tau_b - \tau_0]^{\frac{n+1}{n}}\left[2n^2\tau_0^2 + 2n(n+1)\tau_0\tau_b + (2n+1)(n+1)\tau_b^2\right]\right\}$$

In the above formula, only $\tau_0$ and n are unknown; for different measuring points, it is easy to get V and $\tau_b$, then use reverse order thinking to obtain the Hertz Bar mode rheological parameters;

For the Carson model, deformed by rheological parameters:

$$f(\tau) = \gamma^{0.5} = \frac{(\tau^{0.5} - \tau_c^{0.6})}{\mu_\infty^{0.5}}$$

Substitution points have:

$$\frac{8V}{D} = \frac{\tau_b}{(\tau_b)^3 \mu_\infty}\left[\frac{\tau_b}{6} - \frac{2}{5}(\tau_c\tau_b)^{0.5} + \frac{\tau_c}{4}\right]$$

In the above formula, only $\tau_c$ (Carson dynamic shear force, Pa) and $\mu_\infty$ (limit shear viscosity, mPa·s) are unknown; for V and $\tau_b$, it is easy to obtain at different measuring points, then use reverse order thinking to obtain the Carson mode rheological parameters.

From the above formula, there are the inversion results in different rheological modes, and then substituted into the traditional tube pressure loss calculation formula to obtain the pressure loss value, and flow rate via structure flow formula. The calculation result of the variable mode ($\Delta p$ and q) is finally matched and compared with the measured data ($\Delta P$ and Q). Finally get the evaluation of the most suitable rheological mode and the rheological parameters at current step. The traditional pressure dissipation calculation model for different rheological modes, As shown in Table 1:

TABLE 1

| Rheological Mode | Pressure Drop $\Delta p$ |
|---|---|
| Power law | $\Delta p = \dfrac{4K\Delta L}{D}\left(\dfrac{3n+1}{4n}\right)^n\left(\dfrac{8V}{n}\right)^n$ |
| Bingham | $\Delta p = \dfrac{32\mu_p \Delta L V}{D^2} + \dfrac{16\tau_0 \Delta L}{3D}$ |
| Herschel-Bulkley | $\Delta p = \dfrac{4K\Delta L}{D}\left(\dfrac{3n+1}{4n}\right)^n\left(\dfrac{8V}{n}\right)^n + \left(\dfrac{3n+1}{2n+1}\right)\dfrac{4\tau_0 \Delta L}{3D}$ |
| Carson | $\Delta p = \dfrac{4\Delta L}{D}\left[\left(\mu_\infty \dfrac{8V}{D} - \dfrac{4}{147}\tau_c\right)^{0.5} + \dfrac{8}{7}\tau_c^{0.5}\right]^2$ |

According to the traditional pressure dissipation calculation model, the structure flow under q and $\Delta p$ relation is:

$$q = \frac{\pi \Delta p R^4}{8L\mu}\left(1 - \frac{4}{3}\frac{r_b}{R}\right)$$

Among them, $r_b$ represents the radius of the flow core, that is the output pressure dissipation and flow rate ($\Delta p$ and q). With the measured $Q_{test1}$ (flow test device inlet flow), $Q_{test2}$ (flow test device outlet flow), $P_{test1}$ (inlet pressure of the flow test device), $P_{test2}$ (outlet pressure of the flow test device), then there is the most suitable rheological model evaluation and the parameters of the drilling fluid flowing through at the current step.

Preferably, for the annulus pipe, the rheological parameters can be calculated with the instantaneous pressure and flow rate. Specifically, the calculation for different flow models such as power-law, Bingham, Herschel-Bulkley and Carson use different computational formulas:

For power law fluid, $$Q = \frac{\pi n(R_o + R_i)R_\delta^2}{2(2n+1)}\left(\frac{\tau_b}{K}\right)^{\frac{1}{n}}$$

where Q is the flow rate, $R_o$ is the outer diameter of the annulus, $R_i$ is the inner diameter of the annulus, K is the consistency coefficient, n is the fluidity index, and $\tau_b$ is the shear stress on the cylindrical surface;

For Bingham fluid, $$Q = \frac{\pi(R_o + R_i)R_\delta^2}{6\mu_p}\left[\tau_b - \frac{3}{2}\tau_0 + \frac{\tau_0^3}{2\tau_b^3}\right]$$

where $\tau_0$ is the fluid dynamic shear force and $\mu_p$ is the plastic viscosity;

For Herschel-Bulkley fluid, $$Q = \frac{\pi n(R_o + R_i)R_\delta^2}{2(2n+1)\tau_b^2 K^{\frac{1}{n}}}(\tau_b - \tau_0)^{\frac{n+1}{n}}\left(\tau_b + \frac{n}{n+1}\tau_0\right)$$

For Carson fluid, $$Q = \frac{\pi(R_o + R_i)R_\delta^2}{\mu_\infty \tau_b^2}\left[\frac{1}{6} - (\tau_b^3 - \tau_0^3) - \frac{2}{5}(\tau_c)^{0.5}(\tau_b^{2.5} - \tau_0^{2.5}) + \frac{1}{4}\tau_0(\tau_b^2 - \tau_0^2)\right]$$

where $\tau_c$ is the dynamic shear force for Carson fluid and $\mu_\infty$ is the ultimate shear viscosity.

Preferably, the flow rate and pressure dissipation in annulus pipelines can be calculated with the obtained rheological parameters for different flow models. More specifically, use the different calculation model for different flow models to calculate the pressure dissipation first. Then for fluid flow in annulus pipeline, the flow rate can be calculated by the relation between pressure dissipation and flow rate:

$$q = \sqrt{\Delta p R_\delta / f \rho} / \pi(R_o^2 - R_i^2)$$

Where q is the flow rate, $R_o$ is the outer diameter of the annulus, $R_i$ is the inner diameter of the annulus, $\Delta p$ is the pressure dissipation, and f is the Fanning friction factor.

Figure 3:
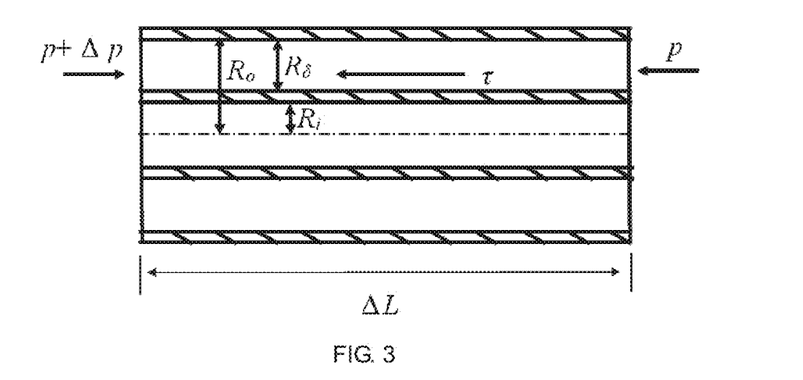
FIG. 3 is a schematic diagram of the equilibrium relationship between annular pressure loss and fluid shear stress.

In a specific embodiment, in the annulus pipeline, a schematic diagram of, the equilibrium relationship between annular pressure loss $\Delta P$ (electrical signal transmitted by the control system 3) and fluid shear stress $\tau$, as shown in FIG. 3, where, $\Delta P = P_{test2} - P_{test1}$ established by the uniform laminar flow control equation, $$\tau = \frac{\Delta P r}{\Delta L}$$

At the pipe wall $$\left(r = \frac{R_\delta}{2}, R_\delta = R_o - R_i\right),$$

if represented by $\tau_b$, there is:

$$\tau_b = \frac{\Delta P R_s}{2\Delta L}$$

Among them, $R_o$ is the outer diameter of the annulus, $R_i$ is the inner diameter of the annulus, and there is a universal equation of the relationship between the flow rate at the annulus pipe section 23 and the pipe wall shear stress, $$Q = \frac{\pi(R_o + R_i)R_\delta^2}{2\tau_b^2}\int_0^{\tau_w} \tau f(\tau) d\tau$$

In the formula, Q is the electrical signal transmitted by the control system 3, that is flow rate (m2/s); $\tau_w$ represents the shear stress at the pipe wall, Pa; For the visco-plastic fluid annulus structure flow (there is a flow core), the above formula is deformed as:

$$Q = \frac{\pi(R_o + R_i)R_\delta^2}{2\tau_w^2}\left(\int_0^{\tau_0} \tau f(\tau)d\tau + \int_0^{\tau_w} \tau f(\tau)d\tau\right)$$

Where $\tau_0$ is the fluid dynamic shear force, Pa; the shear rate in the flow core area $f(\tau)=0$, there is:

$$Q = \frac{\pi(R_o + R_i)R_\delta^2}{2\tau_w^2}\int_0^{\tau_w} \tau f(\tau)d\tau$$

Similarly for the annulus pipe section, there is a real-time automatic inversion of dynamic drilling fluid rheological parameters algorithm steps are: flowmeters and pressure/flow sensors along the line return electrical signals in real time; The control system processes the input electrical signals ($\Delta P$ and Q), output to the core calculation module; Based on the rheological equations in different rheological modes, substituting integrals and inverting rheological parameters in parallel; Then calculating the pressure drop ($\Delta p$) and flow rate (q) along the way from the rheological parameters in different modes; Then compare with real-time data, fit and output the best mode expression and rheological parameter values at the current time step;

Among them, for power law fluid, deformed by rheological parameters and substituted into integrals:

$$Q = \frac{\pi n(R_o + R_i)R_\delta^2}{2(2n+1)}\left(\frac{\tau_b}{K}\right)^{\frac{1}{n}}$$

In the above formula, only K and n are unknown. When $n=1$, $K=\mu$, it is the solution of Newtonian fluid. For different measuring points, Q and $\tau_b$, can be easily obtained, and the rheological parameter value is obtained by the reverse order thinking;

For the Bingham fluid:

$$Q = \frac{\pi(R_o + R_i)R_\delta^2}{6\mu_p}\left[\tau_b - \frac{3}{2}\tau_0 + \frac{\tau_0^3}{2\tau_b^3}\right]$$

In the above formula, only $\tau_0$ (dynamic fluid shear force, Pa) and $\mu_p$ (plastic viscosity, mPa·s) are unknown; for different measuring points, it is easy to obtain Q and $\tau_b$, and the rheological parameter value can be obtained by the reverse order thinking;

For the Hertz-Bar fluid:

$$Q = \frac{\pi(R_o + R_i)R_\delta^2}{2(2n+1)\tau_b^2 K^{\frac{1}{n}}}(\tau_b - \tau_0)^{\frac{n+1}{n}}\left(\tau_b + \frac{n}{n+1}\tau_0\right)$$

In the above formula, only $\tau_0$ (fluid dynamic shear force, Pa), K (consistency coefficient) and n (fluidity index, dimensionless quantity) are unknown; for different measuring points, it is easy to get Q and $\tau_b$, and the rheological parameter value can be obtained by the reverse order;

For the Carson fluid:

$$Q = \frac{\pi(R_o + R_i)R_\delta^2}{\mu_\infty \tau_b^2}\left[\frac{1}{6} - (\tau_b^3 - \tau_0^3) - \frac{2}{5}(\tau_c)^{0.5}(\tau_b^{2.5} - \tau_0^{2.5}) + \frac{1}{4}\tau_0(\tau_b^2 - \tau_0^2)\right]$$

In the above formula, only $\tau_c$ (Carson dynamic shear force, Pa) and $\mu_\infty$ (limit shear viscosity, mPa·s) are unknown; for different measuring points, it is easy to obtain Q and $\tau_b$, and the rheological parameter value can be obtained by the reverse order;

From the above formula, there are the inversion results under different rheological modes, and then substituted into the traditional annulus laminar flow pressure loss calculation formula to obtain the pressure loss value, and flow rate via annulus structure flow formula, Furthermore, the calculation results of different rheological models ($\Delta p$ with q), and finally compared with the measured data ($\Delta P$ with Q). Finally, get the most suitable rheological model evaluation and the rheological parameters at current step. The traditional pressure dissipation calculation model in different rheological models, as shown in Table 2,

| Rheological Mode | Pressure Drop $\Delta p$ |
|---|---|
| Power law | $\Delta p = \frac{2K\Delta L}{R_\delta}\left[\frac{2v(2n+1)}{nR_\delta}\right]^n$ |
| Bingham | $\Delta p = \frac{12\mu_p \Delta L v}{R_\delta^2} + \frac{3\Delta L}{R_\delta}$ |
| Herschel-Bulkley | $\Delta p = \frac{2K\Delta L}{R_\delta}\left[\frac{2v(2n+1)}{nR_\delta}\right]^n + \left(\frac{2n+1}{n+1}\right)\frac{2\tau_0 \Delta L}{R_\delta}$ |
| Carson | $\Delta p = \frac{2\Delta L}{R_\delta}\left[\left(\mu_\infty \frac{6v}{R_\delta} - \frac{3}{50}\tau_c\right)^{0.5} + \frac{6}{5}\tau_c^{ac}\right]^2$ |

Among them, v is the average velocity of the annulus, m/s, and the relationship between the annulus pressure dissipation and flow is given by Fanning-Darcy formula:

$$q = \sqrt{\Delta p R_\delta/fp}/\pi(R_o^2 - R_i^2)$$

Where f is the Fanning resistance coefficient, P is the fluid density, kg/m3, $$f = \begin{cases} \frac{64}{Re} & Re < 2300 \\ \frac{0.316}{Re^{0.25}} & Re \geq 2300 \end{cases}$$

Finally, there are calculated pressure loss and flow results ($\Delta p$ with q) under different rheological modes, and finally compared with $Q_{test1}$, $Q_{test2}$, $P_{test1}$, $P_{test2}$, then there is a pipe section 23 that satisfies the annulus test under the current step. The best rheological model is judged and rheological parameters of drilling fluid flowing through.

The technical scheme of the present invention measures pressure changes under different conditions based on the principle of pipeline flow, combines data analysis and drilling fluid rheological model to inverse optimum rheological parameters; It starts from different rheological modes, reasonable setting of test schemes, real-time calculation, and automatically invert the rheological parameters of the mixed fluid flowing through to overcome the shortcomings of the existing technology, such as low measurement accuracy and slow speed;

The technical scheme of the present invention is directly connected with on-site drilling equipment without manual intervention and has good reliability. It can eliminate data uncertainty under experimental conditions; Also, the scope of physical application is completely dependent on the actual and flow conditions downhole, which can be used to evaluate rheological parameters of drilling fluids in real time. The calculation process is simple and rapid; it can also be used to accurately evaluate the abnormal data caused by the changes during the drilling process, which accurately meets the intelligent drilling technology, such as drilling automation and real-time drilling fluid monitoring.

Finally, it should be noted that the above embodiments are only used to illustrate the technical scheme of the invention and not to restrict it. Notwithstanding the detailed description of the invention by reference to the foregoing embodiments, the ordinary technical personnel in the field shall understand that it is still possible to modify the technical solutions recorded in the foregoing embodiments, or to equivalent replace some of the technical features thereof. However, these modifications or replacements do not remove the essence of the corresponding technical scheme from the spirit and scope of the technical scheme of each embodiment of the invention.

What is claimed is:

1. An automatic measuring method for drilling fluid parameter measurement, comprising:
   providing an automatic measuring system for drilling fluid parameter measurement, comprising: a mud container, a heat exchanger, a plunger pump, a flow test device and a control module, wherein:
      the mud container, the heat exchanger, and the plunger pump are connected in turn with pipeline, the heat exchanger is located below the mud container and configured to receive test drilling fluid from the mud container and heat the test drilling fluid to simulate preset conditions;
      the mud container is configured for a test drilling fluid preparation and a tested samples collection with a liquid inlet and an outlet respectively;
      the mud container comprises a heat jacket arranged on an outer surface of the mud container and mainly configured to keep the test drilling fluid in the mud container warm by heating;
      the plunger pump is configured to pump the test drilling fluid to the flow test device;
      the flow test device is configured to simulate flowing states of drilling fluid in borehole annulus and drilling string, and also measure a pressure and a flow rate of drilling fluid in the flow test device;
      the control module is configured to obtain rheological parameters and a best rheological mode of the drilling fluid in the borehole annulus and the drilling string based on the pressure and the flow rate;
   wherein the system further comprises a check valve, a first back-pressure control valve, a second back-pressure control valve, and a flow meter; the check valve is arranged in an inlet of the flow test device to prevent backflow of the drilling fluid; the first back pressure control valve is arranged between the mud container and the plunger pump, and the second back pressure control valve is arranged between the mud container and the flow test device; the first and second back pressure control valves are configured for throttling; the flow meter is arranged between the check valve and the flow test device to monitor the flow rate of the drilling fluid through the test device;
   simulating the flow state of drilling fluid in annulus or conventional pipeline under actual working conditions, comprising:
      closing the check valve and second back pressure control valve and opening the first back pressure control valve, and injecting the drilling fluid into the mud container after receiving a flow signal from the control module;
      when physical conditions of the drilling fluid in the measuring system reaches certain condition, opening the check valve and the second back pressure valve and closing the first back pressure valve, thereby the plunger pump, the mud container, the heat exchanger, and the flow test device forming mud circulation loop;
   real-time monitoring the pressure and the flow rate of drilling fluid in the mud circulation loop by the flow test device; and
   based on the pressure and the flow rate, obtaining the best rheological model and the associated rheological parameters.

2. The automatic measuring method according to claim 1, further comprising:
   obtaining the best rheological model and the associated rheological parameters, comprising:
      first, obtaining the rheological parameters of different flow models based on the pressure and the flow rate;
      second, calculating the flow rate and pressure dissipation with the obtained rheological parameters and the pressure dissipation calculation model for different rheological models;
      thirdly, comparing and analyzing the calculated values and the measured values to obtain the best rheological model and associated rheological parameters for drilling fluid flow in conventional pipeline or annulus pipeline.

3. The automatic measuring method according to claim 2, wherein: the rheological parameters for the power law model, Bingham model and Herschel-Bulkley model are calculated with the-pressure and the flow rate; the calculation method is defined as following for drilling fluid flow in conventional pipeline; when the test fluid is power law fluid, rheological parameters are calculated as:

$$\frac{8V}{D} = \frac{4n}{(\tau_b)^3 K^{\frac{3}{n}}} \frac{\tau_b^{\frac{3n+1}{n}}}{3n+1}$$

where K is the consistency coefficient, n is the fluidity index, V is the average flow velocity, $\tau_b$ is the shear stress on the cylindrical surface, and D represents the diameter of the conventional pipeline;

for Bingham fluid, the formula for rheological parameters calculation is:

$$\frac{8V}{D} = \frac{\tau_b}{\mu_p}\left[1 - \frac{4\tau_0}{2\tau_b} + \frac{1}{3}\left(\frac{\tau_0}{\tau_b}\right)^4\right]$$

where $\tau_0$ is the fluid dynamic shear force and $\mu_p$ is the plastic viscosity;

for Herschel-Bulkley fluid, the formula for rheological parameters calculation is:

$$\frac{8V}{D} = \frac{4n}{(1+6n+11n^2+6n^3)(\tau_b)^3 K^{\frac{1}{n}}}$$

$$\left\{ [\tau_b - \tau_0]^{\frac{n+1}{n}} [2n^2\tau_0^2 + 2n(n+1)\tau_0\tau_b + (2n+1)(n+1)\tau_b^2] \right\}$$

for Carson fluid, the formula for rheological parameters calculation is:

$$\frac{8V}{D} = \frac{4}{(\tau_b)^3 \mu_\infty}\left[\frac{\tau_b}{6} - \frac{2}{5}(\tau_c\tau_b)^{0.5} + \frac{\tau_c}{4}\right]$$

where $\tau_c$ the dynamic shear force for Carson fluid and $\mu_\infty$ is the ultimate shear viscosity.

4. The automatic measuring method according to claim 2, wherein: the flow rate and the pressure dissipation in conventional pipelines are calculated with the obtained rheological parameters for different flow models; use the different calculation model for different flow models to calculate the pressure dissipation first; then the flow rate is calculated by the relation between pressure dissipation and flow rate:

$$q = \frac{\pi \Delta p R^4}{8L\mu}\left(1 - \frac{4}{3}\frac{r_b}{R}\right)$$

where q is the flow rate, $\Delta_p$ is the pressure dissipation and $r_b$ is the radius of flow core zone.

5. The automatic measuring method according to claim 2, wherein: the rheological parameters are calculated with the pressure and the flow rate; the calculation for different flow models use different computational formulas; for power law fluid, $$Q = \frac{\pi n(R_0 + R_i)R_c^2}{2(2n+1)}\left(\frac{\tau_b}{K}\right)^{\frac{1}{n}}$$

where Q is the flow rate, $R_0$ is the outer diameter of the annulus, $R_i$ is the inner diameter of the annulus, K is the consistency coefficient, n is the fluidity index, and $\tau_b$ is the shear stress on the cylindrical surface;

for Bingham fluid, $$Q = \frac{\pi(R_o + R_i)R_c^2}{6\mu_p}\left[\tau_b - \frac{3}{2}\tau_0 + \frac{\tau_0^3}{2\tau_b^3}\right]$$

where $\tau_0$ is the fluid dynamic shear force and $\mu_p$ is the plastic viscosity;

for Herschel-Bulkley fluid, $$Q = \frac{\pi n(R_o + R_i)R_c^2}{2(2n+1)\tau_b^2 K^{\frac{1}{n}}}(\tau_b - \tau_0)^{\frac{n+1}{n}}\left(\tau_b + \frac{n}{n+1}\tau_0\right)$$

for Carson fluid, $$Q = \frac{\pi n(R_o + R_i)R_c^2}{\mu_\infty \tau_b^2}\left[\frac{1}{6}(\tau_b^3 - \tau_0^3) - \frac{2}{5}(\tau_c)^{0.5}(\tau_b^{2.5} - \tau_0^{2.5}) + \frac{1}{4}\tau_0(\tau_b^2 - \tau_0^2)\right]$$

where $\tau_c$ is the dynamic shear force for Carson fluid and $\mu_\infty$ is the ultimate shear viscosity.

6. The automatic measuring method according to claim 2, wherein: the flow rate and the pressure dissipation in annulus pipelines are calculated with the obtained rheological parameters for different flow models; use the different calculation model for different flow models to calculate the pressure dissipation first, then for fluid flow in annulus pipeline, the flow rate is calculated by the relation between the pressure dissipation and the flow rate:

$$q = \sqrt{\Delta p R_\delta / f \rho} / \pi (R_o^2 - R_i^2)$$

where q is the flow rate, $R_0$ is the outer diameter of the annulus, $R_i$ is the inner diameter of the annulus, $\Delta_p$ is the pressure dissipation, and f is the Fanning friction factor.

* * * * *